United States Patent

Troxler et al.

[15] 3,671,587
[45] June 20, 1972

[54] 4-(2-HYDROXY-3-AMINOPROPOXY)-9-FLUORENONES AND THE SALTS THEREOF

[72] Inventors: Franz Troxler, Bottmingen; Fritz Seemann, Basel, both of Switzerland

[73] Assignee: Sandoz Ltd., (a.k.a. Sandoz AG), Basel, Switzerland

[22] Filed: May 26, 1970

[21] Appl. No.: 40,728

Related U.S. Application Data

[63] Continuation-in-part of Ser. No. 779,268, Nov. 26, 1968, abandoned.

[30] Foreign Application Priority Data

June 3, 1969 Switzerland .......................... 8399/69

[52] U.S. Cl. ..................... 260/570.7, 260/348 R, 260/348.6, 260/465 E, 260/501.12, 260/501.18, 260/501.19, 260/570.9, 260/590, 424/304, 424/330
[51] Int. Cl. ....................................................... C07c 93/06
[58] Field of Search ......... 260/465 E, 570.7, 501.12, 501.18, 260/501.19

[56] References Cited

FOREIGN PATENTS OR APPLICATIONS 1,812,073 7/1969 Germany ............................. 260/570.7

*Primary Examiner*—Robert V. Hines
*Attorney*—Gerald D. Sharkin, Frederick H. Weinfeldt, Robert S. Honor, Walter F. Jewell and Richard E. Vila

[57] ABSTRACT

The present invention provides fluorene derivatives of formula,

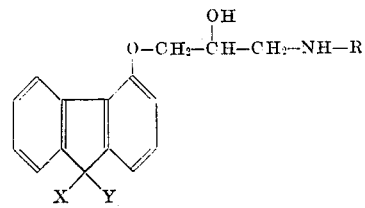

in which R is isopropyl, secondary butyl, tertiary butyl, 3-phenylpropyl, 1-cyano-2-propyl, tert. pentyl or 3-pentyl, and either X is hydrogen and Y is hydroxy, or X and Y together are oxo, and pharmaceutically acceptable acid addition salts thereof.

The compounds of the invention exhibit $\beta$-blocking activity.

9 Claims, No Drawings

4-(2-HYDROXY-3-AMINOPROPOXY)-9-FLUORENONES AND THE SALTS THEREOF

The present invention relates to new tricyclic compounds and is a continuation-in-part of copending application, Ser. No. 779,268 filed on Nov. 26, 1968 and now abandoned.

The present invention provides fluorene derivatives of formula I,

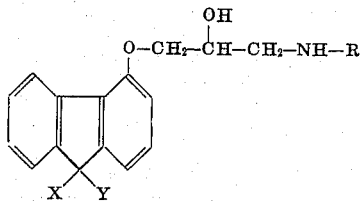

in which R signifies isopropyl, secondary butyl, tertiary butyl, 3-phenylpropyl, 1-cyano-2-propyl, tert. pentyl or 3-pentyl, and either
X signifies hydrogen and
Y signifies a hydroxy radical, or
X and Y together signify an oxo radical, and pharmaceutically acceptable acid addition salts thereof.

The compounds of Formula I have an asymmetric carbon atom in the 2 position of the side chain; further centers of asymmetry are present when the nitrogen atom in the 3 position of the side chain is substituted by a secondary butyl radical or a 1-cyano-2-propyl radical, and/or a hydroxy radical is present in the 9 position of the fluorene structure. The compounds of Formula I may therefore be obtained in optically uniform form, as racemates or in the form of mixtures of racemates or diastereoisomers.

It is to be understood that in the present specification, any reference to the compounds of Formula I is intended to embrace all possible stereoisomeric forms thereof.

The compounds of Formula I and their salts may be obtained by a. reacting 4-hydroxy-fluoren-9-one in an alkaline medium or 4-hydroxy-fluoren-9-ol in the form of a mono-(-4-)-alkali metal or -ammonium salt, with epichlorhydrin or epibromhydrin, and heating the resulting reaction product with an amine of formula II,

in which R has the above significance, or b. producing a compound of Formula Ia,

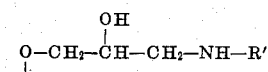

in which R' signifies isopropyl, secondary butyl, tertiary butyl, 3-phenylpropyl, tert.pentyl or 3-pentyl, by reducing a compound of Formula Ib,

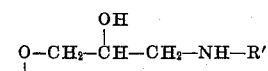

in which R' has the above significance, with a complex alkali metal hydride, or c. producing a compound of Formula Ia by catalytic hydrogenation of a compound of Formula III,

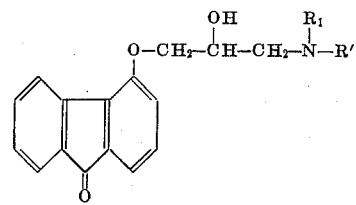

in which R' has the above significance, and $R_1$ signifies hydrogen or benzyl, or a compound of Formula IV,

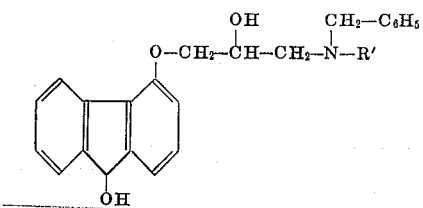

in which R' has the above significance, and optionally converting the resulting compounds into the corresponding salts by reaction with inorganic or organic acids.

In process (a), the 4-hydroxy-fluoren-9-one may be used in the form of an alkali metal or ammonium salt, preferably its sodium salt. The 4-hydroxy-fluoren-9-ol is used in the form of a mono-(-4-)-alkali metal or -ammonium salt. The salts are preferably used in solution or suspension in a suitable solvent.

The process may for example be carried out by adding 1 to 5 equivalents of epichlorhydrin or epibromhydrin at room temperature or at an elevated temperature (e.g. 50° C.) to a solution or suspension of the 4-hydroxy-fluoren-9-one salt or 4-hydroxy-fluoren-9-ol salt. The mixture may be stirred for an extended period, e.g., 10 to 24 hours, at room temperature or at an elevated temperature. 4-hydroxy-fluoren-9-one and 4-hydroxy-fluoren-9-ol are sensitive to oxidation in an alkaline medium, so that the reactions indicated above are preferably effected in the absence of oxygen, e.g. in an atmosphere of nitrogen.

Working up may be effected in conventional manner by shaking out the reaction mixture several times between water and a water-immiscible organic solvent, e.g. ethyl acetate or methylene chloride, separating the organic phases, combining the same, drying (e.g. over magnesium sulphate) and concentrating by evaporation; the product obtained as residue may be further worked up without previous purification.

The resulting reaction product may be reacted with the amine of Formula II, e.g., isopropylamine, tertiary butylamine or 3-aminobutyronitrile, in an organic solvent which is inert under the reaction conditions. Suitable solvents include benzene, toluene and dioxane. The reaction is preferably effected for about 2 to 20 hours at a temperature between 50° and 120° C., preferably at the reflux temperature of the reaction mixture. The addition of an acid-binding agent, e.g. an inorganic base such as potassium carbonate, a tertiary organic base such as pyridine or triethylamine, or an excess of the amine of Formula II, may be advantageous, but is not essential.

Working up may be effected in conventional manner by concentrating the reaction mixture by evaporation, shaking out the residue between an aqueous acid, e.g. N hydrochloric acid, and an organic solvent which is not miscible with the acid, e.g. benzene or ethyl acetate, subsequently making the acid aqueous phase alkaline (e.g. by the addition of an aqueous alkali hydroxide solution), taking up the liberated basic products in a suitable organic solvent, e.g. methylene chloride, and finally concentrating the separated and dried organic phases by evaporation at reduced pressure.

Suitable solutions or suspensions of a salt of 4-hydroxy-fluoren -9-one for use in process (a) may for example be prepared by heating 4-hydroxy-fluoren -9-one to the boil for about ½ to 3 hours, e.g. in an equimolar aqueous alkali hydroxide or ammonia solution while stirring, or reacting it in an organic solvent which is inert under the reaction conditions, e.g. benzene or toluene, with an equimolar amount of an alkali metal alcoholate, amide or hydride. Alternatively, the alcoholic solution of an alkali metal salt of 4-hydroxy-fluoren-9-one may be evaporated to dryness and the residue suspended in an inert organic solvent, e.g. dimethoxy ethane. Furthermore, 4-hydroxy-fluoren-9-one may be converted into the corresponding salt, in an suitable organic solvent, e.g. dioxane, by the addition of an aqueous alkali metal hydroxide or ammonia solution or a solution of an alkali metal alkanolate in a lower alkanol, and may be isolated by filtration or evaporation of the mixture, depending on its solubility in the solvent which is used, and subsequently dissolved or suspended in a suitable solvent, e.g. water, alkanols, benzene or dimethyl ether.

Suitable solutions or suspensions of a salt of 4-hydroxy-fluoren-9-ol for use in process (a) may for example be prepared by adding 4-hydroxy-fluoren-9-ol to an equimolar aqueous alkali hydroxide or ammonia solution; optionally the resulting solution may be subsequently evaporated to dryness and the resulting residue suspended in an inert organic solvent, e.g. dimethoxyethane. Alternatively, 4-hydroxy-fluoren-9-ol may be converted into the corresponding salt, in a suitable organic solvent, e.g. dioxane, by the addition of one equivalent of an aqueous alkali metal hydroxide or ammonia solution, and the salt may be isolated by filtration or evaporation of the mixture, depending on its solubility in the solvent which is used, and subsequently may be dissolved or suspended in a suitable solvent, e.g. water, alkanols, benzene or dimethoxyethane.

In process (b) the reduction of a compound of Formula I$b$, e.g. 4-(2-hydroxy-3-isopropylaminopropoxy)fluoren-9-one, is preferably effected with sodium borohydride in a suitable organic solvent, e.g. methanol, ethanol or other lower alkanols. The reduction may be effected at room temperature or at an elevated temperature, for about ½ to 15 hours.

Working up may be effected by evaporating the reaction mixture to dryness, shaking out the residue between water and a water-immiscible organic solvent, e.g. ethyl acetate, and separating the organic phase, drying (e.g. over magnesium sulphate) and concentrating by evaporation to dryness.

The reduction of a compound of Formula I$b$ may also be effected with lithium aluminum hydride in an organic solvent which is inert under the reaction conditions. Suitable solvents include diethyl ether, tetrahydrofuran, dioxane or other open-chain or cyclic ethers. The reduction is preferably effected at the reflux temperature of the reaction mixture; in this case working up may be effected by adding methanol dropwise to the reaction mixture and subsequently adding a saturated aqueous sodium sulphate solution, filtering off the resulting precipitate and evaporating the filtrate to dryness.

In process (c) the hydrogenation of a compound of Formula III or IV is preferably effected in the presence of a noble metal catalyst, e.g. palladium. The reaction may be carried out in a suitable organic solvent, e.g. ethanol or ethyl acetate. When compounds of formula III, e.g. 4-[3-(N-benzylisopropylamino)-2-hydroxypropoxy]fluoren-9-one, are used as starting materials, the oxo radical is reduced to the hydroxy radical, and any benzyl radical which may be present is split off hydrogenolytically; when compounds of formula IV, e.g. 4-[3-(N-benzylisopropylamino)-2-hydroxypropoxy]fluoren-9-ol, are used as starting materials, the benzyl radical is split off hydrogenolytically. Working up of the reaction products may be effected in conventional manner, e.g. by filtering off the catalyst and evaporating the filtrate to dryness, whereby the compounds of Formula I$a$ are obtained as residue.

The resulting crude products of Formula I may be purified in manner known per se, e.g. by adsorption chromatography, crystallization from suitable solvents, e.g. ethyl acetate or chloroform/ethyl acetate, or by salt formation (e.g. with maleic acid or N-cyclohexylsulphamic acid) and subsequent crystallization of the resulting salts from suitable solvents, e.g. methanol/ethyl acetate.

It is to be understood that when particular stereoisomeric forms of the compounds of Formula I are required, these may be obtained from corresponding stereoisomeric starting materials. For example, the compounds which are sterically uniform with regard to the carbon atom in the 2 position of the side chain, may be obtained in accordance with method (a) by using optically uniform epichlorhydrin or epibromhydrin, and in accordance with methods (b) and (c) by using compounds of Formula I$b$, III or IV, which are sterically uniform with regard to the carbon atom in the 2 position of the side chain.

The compounds of Formula I are basic, crystalline or oily compounds, which are practically insoluble in water, but usually fairly or readily soluble in most organic solvents and in aqueous solutions of organic or inorganic acids. With inorganic acids, e.g. hydrochloric, hydrobromic or sulphuric acid, or with organic acids, e.g. oxalic, fumaric, maleic, tartaric, benzoic, methane-, ethane- or p-toluene-sulphonic acid or N-cyclohexylsulphamic acid, they form stable, usually water-soluble salts.

The compounds of Formula I$b$ are a class of compounds I; they may be obtained in accordance with method (a) by reacting 4-hydroxy-fluoren-9-one in an alkaline medium with epichlorhydrin or epibromhydrin and heating the reaction product with an amine of Formula IIa, $$H_2N-R' \qquad \qquad IIa$$

in which R' has the above significance.

The compounds of formula III may be obtained by reacting 4-hydroxy-fluoren-9-one in an alkaline medium with epichlorhydrin or epibromhydrin and heating the reaction product with an amine of formula V,

in which $R_1$ and R' have the above significance, [in a manner analogous to method (a)]; compounds of Formula IIIa,

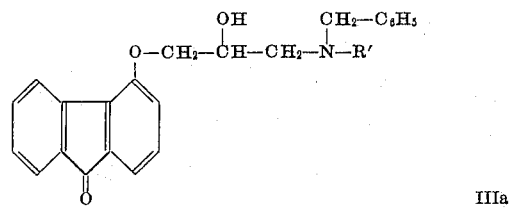

in which R' has the above significance, may also be obtained [in a manner analogous to method (a), but reversing the sequence of the individual reaction steps] by heating an amine of formula VI,

in which R' has the above significance, with epichlorhydrin or epibromhydrin, and reacting the resulting basically substituted chlorhydrin or bromhydrin in an alkaline medium with 4-hydroxy-fluoren-9-one.

The compounds of formula IV may be obtained

α. by reducing a compound of Formula IIIa with a complex alkali metal hydride, or β. by reacting 4-hydroxy-fluoren-9-ol in the form of a mono-(-4-)-alkali metal or -ammonium salt with epichlorhydrin or epibromhydrin and heating the reaction product with an amine of formula VI [in a manner analogous to method (a)], or γ. by heating an amine of Formula VI with epichlorhydrin or epibromhydrin, and reacting the resulting basically substituted chlorhydrin or bromhydrin with a mono-(-4-)-alkali metal or -ammonium salt of 4-hydroxy-fluoren-9-ol [in a manner analogous to method (a), but reversing the sequence of the individual reaction steps].

Compounds of Formulae I$b$, III and IV, which are sterically uniform with regard to the carbon atom in the 2 position of the side chain, are obtained when their production is effected (as described above) in a manner analogous to method (a), using optically active epichlorhydrin or epibromhydrin. Compounds of Formulae IIIa and IV, which are sterically uniform with regard to the carbon atom in the 2 position of the side chain, may also be obtained (as described above) in a manner analogous to method (a), but reversing the sequence of the individual reaction steps and using either optically active epichlorhydrin or epibromhydrin, or racemic epichlorhydrin or epibromhydrin; the resulting racemates or mixtures of stereoisomers of the basically substituted chlorhydrins or bromhydrins are then separated before further reaction thereof. The corresponding compounds of Formula IV may also be obtained by reducing a compound of Formula IIIa, which is already sterically uniform with regard to the carbon atom in the 2 position of the side chain, with a complex alkali metal hydride.

4-hydroxy-fluoren-9-ol may be obtained by reduction e.g. by catalytic hydrogenation or with a complex alkali metal hydride) of 4-hydroxy-fluoren-9-one. The reduction may be effected in manner analogous to that described for processes (b) and (c) for the production of compounds of Formula I.

The hitherto unknown starting materials of Formulae III and IV and 4-hydroxy-fluoren-9-ol are also included in the present invention.

The compounds are useful because they possess pharmacological activity in in vitro and in vivo tests. The compounds are useful β-adrenergic blocking agents, or more particularly, the compounds have a blocking effect on the adrenergic β-receptors as indicated by an inhibition of the positive inotropic adrenalin effect in the spontaneously beating, isolated guinea pig atrium at bath concentrations of 0.01 to 1 mg/liter. In the narcotized animal (cat, dog) the compounds furthermore inhibit the tachycardia and hypotension caused by isoproterenol. β-blocking agents are known for use in the prophylaxis and therapy of coronary illnesses, particularly Angina pectoris, and also in the treatment of hyperkinetic heart syndrome, muscular hypertrophic subvalvular aortostenosis, heart rhythm disorders and tachycardiac conditions.

The above properties are particularly exhibited by those compounds of Formula I which correspond stereochemically to laevorotatory or racemic epichlorhydrin in the 2-position of the side chain.

For the above-mentioned use, the dosage administered will, of course, vary depending upon the compound employed mode of administration and treatment desired. However, in general satisfactory results are obtained when administered at a daily dosage of from about 0.02 milligrams to about 5.0 milligrams per kilogram animal body weight, conveniently given in divided doses 2 to 3 times a day or in sustained release form. For the larger mammals, the total daily dosage ranges from about 2 milligrams to about 100 milligrams, and dosage forms suitable for oral administration contain from about 0.6 milligrams to about 50 milligrams of the compound admixed with a solid or liquid pharmaceutical carrier or diluent.

The compounds may be used as medicaments on their own or in the form of appropriate medicinal preparations, e.g. tablets, dragées, suppositories, injectable solutions, for enteral or parenteral administration. Aside from the usual inorganic or organic, pharmacologically inert adjuvants, e.g. lactose, starch, talcum polyvinyl pyrrolidone, stearic acid, water, alcohols, natural or hardened oils and waxes, these preparations may also contain suitable preserving, stabilizing or wetting agents, solubilizers, sweetening or coloring substances and flavorings. The compounds of Formula I may be used in the form of their physiologically acceptable acid addition salts which have the same order of activity as the free bases.

In the following non-limitative examples all temperatures are indicated in degrees Centigrade and are uncorrected.

EXAMPLE 1: 4-(2-hydroxy-3-isopropylaminopropoxy)fluoren-9-one.

10 g of 4-hydroxyfluoren-9-one, 1.9 g of sodium hydroxide and 100 cc of water are heated to the boil while stirring in an atmosphere of nitrogen for 1 hour. The mixture is allowed to cool to 50°, 7 g of epichlorhydrin are added and the mixture is stirred at 50° for a further 16 hours. The reaction mixture is subsequently extracted thrice with ethyl acetate with the addition of some acetone; the organic phases are separated, combined, washed thrice with water, dried over magnesium sulphate and evaporated to dryness at reduced pressure.

13.7 g of the semicrystalline residue are taken up in 150 cc of dioxane and heated at reflux for 20 hours with 50 cc of isopropylamine. The reaction mixture is evaporated to dryness at reduced pressure and the residue is shaken out thrice between ethyl acetate and N hydrochloric acid. The combined hydrochloric acid extracts are heated to 60°–80° for 30 minutes, are cooled and subsequently filtered until clear. A 40 percent caustic soda solution is added to the filtrate until an alkaline reaction is obtained and extraction is effected several times with methylene chloride; the organic phases are separated, combined, dried over magnesium sulphate and concentrated by evaporation at reduced pressure. The residue is recrystallized from chloroform/ethyl acetate, whereby 4-(2-hydroxy-3-isopropylaminopropoxy)fluoren-9-one is obtained in the form of yellow needles having a M.P. of 136°–138°.

Example 2: 4-(3-tert.butylamino-2-hydroxypropoxy)fluoren-9-one.

26 g of 4-hydroxyfluoren-9-one are dissolved in 800 cc of dioxane and after the addition of a solution of 8 g of sodium hydroxide in 10 cc of water the mixture is stirred at room temperature for 10 hours. The precipitated sodium salt of 4-hydroxyfluoren-9-one is filtered off, dissolved in 600 cc of water and stirred at room temperature for 24 hours with 37 g of epichlorhydrin. The reaction mixture is subsequently extracted thrice with methylene chloride, the combined methylene chloride extracts are dried over magnesium sulphate, filtered and the filtrate is evaporated to dryness at reduced pressure.

6.5 g of the residue are taken up in 50 cc of dioxane and heated at reflux for 20 hours with 25 cc of tert.butylamine. The reaction mixture is evaporated to dryness at reduced pressure and the residue is shaken out thrice between benzene and N hydrochloric acid. The combined hydrochloric acid extracts are made alkaline with a 40 percent solution of caustic soda and extracted several times with methylene chloride. The organic phases are combined, dried over magnesium sulphate and concentrated by evaporation at reduced pressure. The residue is recrystallized from ethyl acetate, whereby 4-(3-tert.butyl-amino-2-hydroxypropoxy)fluoren-9-one is obtained in the form of orange-colored crystals having a M.P. of 154°–157°.

Example 3: 4-(3-tert.butylamino-2-hydroxypropoxy)fluoren-9-one.

This compound is obtained in a manner analogous to that indicated in Example 2, except that epibromhydrin is used in place of epichlorhydrin. The compound indicated in the heading is identical with the product produced in accordance with Example 2; after crystallization from ethyl acetate it has a M.P. of 154°–157° (orange-colored crystals).

Example 4: 4-(3-sec.butylamino-2-hydroxypropoxy)fluoren-9-one.

This compound is obtained in a manner analogous to that indicated in Example 2, except that sec. butylamine is used in place of tert.butylamine. The hydrogen maleate of the compound indicated in the heading crystallizes from methanol/ethyl acetate in the form of orange-colored crystals having a M.P. of 144°–147°.

Example 5: 4-[2-hydroxy-3-(3-phenyl-1-propylamino)propoxy]fluoren-9-one.

This compound is obtained in a manner analogous to that indicated in Example 2, except that 3-phenylpropylamine is used in place of tert.butylamine. The N-cyclohexyl sulphamate of the compound indicated in the heading crystallizes from methanol/ethyl acetate in yellow crystals having a M.P. of 110°–112°.

Example 6: 4-[3-(1-cyano-2-propylamino)-2-hydroxypropoxy]fluoren-9-one.

6.5 of 4-hydroxyfluoren-9-one are dissolved in 200 cc of dioxane and after the addition of a solution of 2 g of sodium hydroxide in 2.5 cc of water, the mixture is stirred at room temperature for 10 hours. The precipitated sodium salt of 4-hydroxyfluoren-9-one is filtered off, dissolved in 150 cc of water and stirred at room temperature for 24 hours with 9.25 g of epichlorhydrin. The reaction mixture is subsequently extracted thrice with methylene chloride, the combined extracts are dried over magnesium sulphate, filtered and the filtrate is evaporated to dryness at reduced pressure.

6.5 g of the residue are taken up in 50 cc of dioxane and heated at reflux for 20 hours with 3.55 g of 3-aminobutyronitrile. The reaction mixture is evaporated to dryness at reduced pressure and the residue is shaken out thrice between benzene and N hydrochloric acid. The combined hydrochloric acid extracts are made alkaline with a 40 percent solution of caustic soda and are extracted several times with methylene chloride. The organic phases are combined, dried over magnesium sulphate and evaporated to dryness at reduced pressure. The resulting residue is crystallized from ethyl acetate, whereby the compound indicated in the heading is obtained in the form of orange-colored crystals having a M.P. of 111°–115°.

Example 7: 4-[3-(1-cyano-2-propylamino)-2-hydroxypropoxy]fluoren-9-one.

This compound is obtained in a manner analogous to that indicated in Example 6, except that epibromhydrin is used in place of epichlorhydrin. The compound indicated in the heading is identical with the product obtained in accordance with Example 6; after crystallization from ethyl acetate it has a M.P. of 111°–115°.

Example 8: 4-(2-hydroxy-3-isopropylaminopropoxy)fluoren-9-ol.

3.5 g of 4-(2-hydroxy-3-isopropylaminopropoxy)fluoren-9-one are dissolved in 100 cc of ethanol and 5 g of sodium borohydride are added portionwise while stirring. The mixture is stirred at room temperature for 12 hours, is then evaporated to dryness at reduced pressure and the residue is shaken out thrice between ethyl acetate and water. The combined ethyl acetate phases are dried over magnesium sulphate and subsequently concentrated until crystallization commences. The compound indicated in the heading is filtered off and crystallized from ethyl acetate; it has a M.P. of 149°–150°.

The production of the starting material is described in Example 1.

Example 9: 4-(2-hydroxy-3-isopropylaminopropoxy)fluoren-9-ol.

This compound is obtained in a manner analogous to that indicated in Example 1, except that 4-hydroxyfluoren-9-ol is used in place of 4-hydroxyfluoren-9-one. The resulting product is identical with the compound produced in accordance with Example 8; the compound indicated in the heading has a M.P. of 149°–140° after crystallization from ethyl acetate.

The 4-hydroxyfluoren-9-ol used as starting material is obtained by reduction of 4-hydroxyfluoren-9-one, e.g. with sodium borohydride in ethanol (in a manner analogous to that described in Example 8) or by hydrogenation in the presence of a palladium catalyst in methanol (in a manner analogous to that described in Examples 10 and 11); 4-hydroxyfluoren-9-ol is further worked up as crude product without previous purification.

Example 10: 4-(2-hydroxy-3-isopropylaminopropoxy)fluoren-9-ol.

1.7 g of 4-[3-(N benzylisopropylamino)-2-hydroxypropoxy]-fluoren-9-one are taken up in 50 cc of methanol and shaken with hydrogen at room temperature in the presence of 300 mg of a palladium catalyst (5 percent on aluminium oxide) until the taking up of hydrogen stops. The catalyst is filtered off and the filtrate is evaporated to dryness at reduced pressure. The resulting 4-(2-hydroxy-3-isopropylaminopropoxy)fluoren-9-ol has a M.P. of 146°–149° after crystallization from ethyl acetate.

The starting material may, for example, be produced as follows:

a. A mixture of 18.4 g of epichlorhydrin and 29.8 g of N-benzyl-isopropylamine in 100 cc of benzene is heated to the boil at reflux for 24 hours, the solvent is subsequently evaporated and the residue distilled in a high vacuum; 1-(N-benzylisopropylamino)-3-chloro-2-propanol, having a B.P. of 110°–115°/10.2 mm of Hg, is obtained.

A solution of 980 mg of 4-hydroxyfluoren-9-one in 50 cc of absolute dioxane is added to a solution of 144 mg of sodium in 25 cc of absolute methanol and the mixture is subsequently evaporated to dryness in a vacuum. The residue is suspended in 70 cc of dioxane and heated to the boil while stirring for 16 hours with 1.63 g of 1-N-benzylisopropylamino)-3-chloro-2-propanol. The mixture is evaporated to dryness at reduced pressure and the residue is shaken out between ethyl acetate and an N aqueous tartaric acid solution. The combined tartaric acid extracts are made alkaline with a 2 N solution of caustic soda while cooling and are subsequently extracted with methylene chloride. The combined methylene chloride extracts are concentrated by evaporation, whereby 4-[3-(N-benzylisopropylamino)-2-hydroxypropoxy]fluoren-9-one is obtained as a viscous resin.

b. 6.5 g of 4-hydroxy-fluoren-9-one are dissolved in 200 cc of dioxane and after the addition of a solution of 2 g of sodium hydroxide in 2.5 cc of water the mixture is stirred at room temperature for 10 hours. The precipitated sodium salt of 4-hydroxy-fluoren-9-one is filtered off, dissolved in 150 cc of water and stirred at room temperature for 24 hours with 9.25 g of epichlorhydrin. The reaction mixture is subsequently extracted thrice with methylene chloride, the combined extracts are dried over magnesium sulphate, filtered and the filtrate is evaporated to dryness at reduced pressure.

6.5 g of the residue are taken up in 50 cc of dioxane and heated at reflux for 20 hours with 5 g of N-benzylisopropylamine. The reaction mixture is evaporated to dryness at reduced pressure and the residue is shaken out between benzene and N hydrochloric acid. The combined hydrochloric acid extracts are made alkaline with a 40 percent solution of caustic soda while cooling and are extracted several times with methylene chloride. The combined organic phases are dried over magnesium sulphate and evaporated to dryness at reduced pressure, whereby 4-[3-(N-benzylisopropylamino)-2-hydroxypropoxy]fluoren-9-one is obtained as a viscous resin.

Example 11: 4-(2-hydroxy-3-isopropylaminopropoxy)fluoren-9-ol.

2.4 g of 4-[3-(N-benzylisopropylamino)-2-hydroxypropoxy]fluoren-9-ol are taken up in 100 cc of methanol and shaken with hydrogen at room temperature in the presence of 500 mg of a palladium catalyst (5 percent on aluminium oxide) until the taking up of hydrogen stops. The catalyst is filtered off and the filtrate is evaporated to dryness at reduced pressure. The compound indicated in the heading is obtained as residue; M.P. 149°–150° (from ethyl acetate).

The starting material may, for example, be produced as follows:

3.5 g of 4-[3-(N-benzylisopropylamino)-2-hydroxpropoxy]-fluoren-9-one (production see Example 10) are dissolved in 50 cc of ethanol and 4 g of sodium borohydride are added portionwise while cooling with ice and stirring. Stirring is continued for 3 hours and the mixture is then concentrated by evaporation at reduced pressure. The residue is shaken out between ethyl acetate and water, the ethyl acetate phase is dried over magnesium sulphate and evaporated to dryness at reduced pressure. After chromatography of the crude product on 50 g of silica gel with methylene chloride + 1 percent of methanol 4-[3-(N-benzylisopropylamino)-2-hydroxypropoxy]fluoren-9-ol is obtained as a viscous resin.

Example 12: 4-[2-Hydroxy-3-(3-pentylamino)propoxy]-9-fluorenone.

5.47 g of 4-(2,3-epoxypropoxy)-9-fluorenone and 7.3 g of 3-pentyl amine are heated to the boil in 25 cc of dioxane for 24 hours. The reaction mixture is evaporated to dryness and the residue is shaken out between ether and a 1 N tartaric acid solution. The tartaric acid phases are made alkaline with 5 N sodium hydroxide while cooling with ice and are extracted with methylene chloride. The evaporation residue of the methylene chloride phases which have been dried over magnesium sulphate, is crystallized with ethyl acetate and yields 4-[2-hydroxy-3-(3-pentylamino)propoxy]-9-fluorenone in the form of orange-clored needles having a M.P. of 95°–98°.

The 4-(2,3-epoxypropoxy)-9-fluorenone used as starting material may, for example, be obtained as follows.

20 g of 4-hydroxy-9-fluorenone, 120 g of epichlorhydrin and 0.2 g of piperidine are heated to 95° for 20 hours while stirring. The excess epichlorhydrin is removed by distillation in a vacuum, the residue is dissolved in methylene chloride and shaken out twice with 200 cc of a 2 N caustic soda solution. The methylene chloride phase is dried over magnesium sulphate and the solvent is removed by evaporation at reduced pressure. The resulting oil is crystallized with benzene/ether 1:1, whereby 4-(2,3-epoxypropoxy)-9-fluorenone is obtained as yellow crystalline product having a M.P. of 108°–116°.

Example 13: 4-(2-Hydroxy-3-tert.pentylaminopropoxy)-9-fluorenone.

This compound is obtained in a manner analogous to that described in Example 1, except that tert.pentyl amine is used in place of 3-pentyl amine. The title compound crystallizes from benzene in the form of orange-colored crystals having a M.P. of 135°–137°.

Example 14: 4-[2-Hydroxy-3-(3-pentylamino)propoxy]-9-fluorenone.

This compound is obtained in a manner analogous to that described in Example 1, except tat epibromhydrin is used in place of epichlorhydrin. The title compound which is identical with the product produced in accordance with Example 1, is obtained. M.P. 96°–98° after crystallization from ethyl acetate.

Example 15: 4-(2-Hydroxy-3-tert.pentylaminopropoxy)-9-fluorenone.

This compound is obtained in a manner analogous to that described in Example 2, except that epibromhydrin is used in place of epichlorhydrin. The title compound which is identical with the product produced in accordance with Example 2, is obtained. M.P. 135°–137° after crystallization from benzene.

EXAMPLE 16

| Galenical Preparation | Tablets |
| --- | --- |
| 4-(2-hydroxy-3-isopropylaminopropoxy)-fluoren-9-one (compound of Example 1) | 0.010 g |
| Magnesium stearate | 0.001 g |
| Polyvinyl pyrrolidone | 0.004 g |
| Talcum | 0.005 g |
| Maize starch | 0.010 g |
| Lactose | 0.128 g |
| Dimethylsilicone oil | 0.0005 g |
| Polyethylene glycol 6000 | 0.0015 g |
| for a tablet of | 0.160 g |

What is claimed is:
1. A compound of the formula:

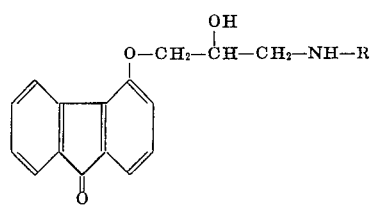

in which R is isopropyl, secondary butyl, tertiary butyl, 3-phenylpropyl, tert. pentyl or 3-pentyl, or a pharmaceutically acceptable acid addition salt thereof.

2. The compound of claim 1, which is 4-(2-hydroxy-3-isopropylaminopropoxy)fluoren-9-one.

3. The compound of claim 1, which is 4-(3-tert.butylamino-2-hydroxypropoxy)fluoren-9-one.

4. The compound of claim 1, which is 4-(3-sec.butylamino-2-hydroxypropoxy)fluoren-9-one.

5. The compound of claim 1, which is 4-[2-hydroxy-3-(3-phenyl-1-propylamino)propoxy]fluoren-9-one.

6. The compound of claim 1, which is 4-[2-hydroxy-3-(3-pentylamino)propoxy]-9-fluorenone.

7. The compound of claim 1, which is 4-(2-hydroxy-3-tert.pentylaminopropoxy)-9-fluorenone.

8. A compound of formula:

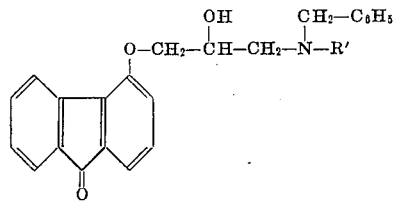

in which R' is isopropyl, secondary butyl, tertiary butyl, 3-phenyl-propyl, tert. pentyl or 3-pentyl, or a pharmaceutically acceptable acid addition salt thereof.

9. The compound of claim 8 which is 4-[3-(N-benzylisopropylamino)-2-hydroxypropoxy]-fluoren-9-one.

* * * * *

UNITED STATES PATENT OFFICE
CERTIFICATE OF CORRECTION

Patent No. 3,671,587                Dated June 20, 1972

Inventor(s) Franz Troxler, Fritz Seemann

It is certified that error appears in the above-identified patent and that said Letters Patent are hereby corrected as shown below:

Title Page

After item 63 in item 30 insert the followings.

| December 6, 1967 | Switzerland | No. 17057/67 |
| September 20, 1968 | Switzerland | No. 14155/68 |
| September 27, 1968 | Switzerland | No. 14526/68 |
| February 14, 1968 | Switzerland | No. 2194/68 |

Signed and sealed this 12th day of November 1974.

(SEAL)
Attest:

McCOY M. GIBSON JR.
Attesting Officer

C. MARSHALL DANN
Commissioner of Patents